US007564722B2

(12) United States Patent
Klein (10) Patent No.: US 7,564,722 B2
(45) Date of Patent: Jul. 21, 2009

(54) MEMORY SYSTEM AND METHOD HAVING VOLATILE AND NON-VOLATILE MEMORY DEVICES AT SAME HIERARCHICAL LEVEL (75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/656,578

(22) Filed: Jan. 22, 2007

(65) Prior Publication Data
US 2008/0177923 A1 Jul. 24, 2008

(51) Int. Cl.
G11C 16/04 (2006.01)
(52) U.S. Cl. ............... 365/185.33; 365/189.05; 365/189.08; 365/189.2; 365/223
(58) Field of Classification Search ............ 365/185.08, 365/185.33, 189.05, 189.08, 189.2, 191, 365/223
See application file for complete search history.

(56) References Cited

U.S. PATENT DOCUMENTS

| 6,256,723 | B1 * | 7/2001 | Hudson et al. ............... 712/35 |
| 6,476,854 | B1 * | 11/2002 | Emerson et al. ............ 348/143 |
| 6,564,286 | B2 | 5/2003 | DaCosta ..................... 711/103 |
| 7,152,138 | B2 * | 12/2006 | Spencer et al. .............. 711/103 |
| 2006/0149857 | A1 * | 7/2006 | Holman ........................ 710/3 |
| 2006/0221756 | A1 * | 10/2006 | Miura et al. ........... 365/230.03 |
| 2006/0294295 | A1 * | 12/2006 | Fukuzo ...................... 711/105 |
| 2007/0079065 | A1 * | 4/2007 | Bonella et al. .............. 711/113 |
| 2007/0124548 | A1 * | 5/2007 | Vogt ............................ 711/154 |
| 2008/0040563 | A1 * | 2/2008 | Brittain et al. .............. 711/154 |
| 2008/0163032 | A1 * | 7/2008 | Lastras-Montano ......... 714/785 |

FOREIGN PATENT DOCUMENTS

WO 2006/026645 A2 3/2006

* cited by examiner

Primary Examiner—Thong Q Le
(74) Attorney, Agent, or Firm—Dorsey & Whitney LLP (57) ABSTRACT A processor-based system includes a processor coupled to core logic through a processor bus. This includes a dynamic random access memory ("DRAM") memory buffer controller. The DRAM memory buffer controller is coupled through a memory bus to a plurality of a dynamic random access memory ("DRAM") modules and a flash memory module, which are at the same hierarchical level from the processor. Each of the DRAM modules includes a memory buffer to the memory bus and to a plurality of dynamic random access memory devices. The flash memory module includes a flash memory buffer coupled to the memory bus and to at least one flash memory device. The flash memory buffer includes a DRAM-to-flash memory converter operable to convert the DRAM memory requests to flash memory requests, which are then applied to the flash memory device.

57 Claims, 2 Drawing Sheets

MEMORY SYSTEM AND METHOD HAVING VOLATILE AND NON-VOLATILE MEMORY DEVICES AT SAME HIERARCHICAL LEVEL

TECHNICAL FIELD

This invention relates to memory systems, and, more particularly, to a memory system using non-volatile memory in essentially the same location as system memory.

BACKGROUND OF THE INVENTION

Conventional computer systems, such as personal computer systems, generally utilize a hierarchical architecture having several levels. The highest level, which is generally connected to a processor through a processor bus, is a system controller or the like. The system controller includes a memory controller that is connected to system memory, which is generally implemented using dynamic random access memory ("DRAM") devices. The system controller also serves as a bridge, sometimes known as a "North Bridge," to a peripheral bus, such as a peripheral component interface ("PCI") bus. Peripheral components such as hard disk drives, Ethernet interfaces, and the like may be connected to this peripheral bus. A second bus bridge, sometimes known as a "South Bridge," is sometimes used to connect the first peripheral bus to a second peripheral bus, such as an LPC (Low Pin Count) bus. Input/output devices such as keyboards, mice, serial and parallel ports are commonly connected to this bus.

Hard disk drives are typically used in computer systems to store a large volume of data and instructions. Hard disk drives have the advantage of being non-volatile so that data stored in the disk drive are not lost when power is removed from the system. However, hard disk drives also have certain disadvantages. For example, it can require a considerable amount of power to keep hard disk drives powered so they can be available to access data more quickly. Also, since accessing data stored in a hard disk drive normally requires physical movement of a read/write head, the latency period for accessing data can be considerable. To minimize these and other limitations of hard disk drives, proposals have been made to incorporate a small amount of solid state non-volatile memory, such as flash memory devices, in hard disk drives. Using flash memory devices provides several advantages, including lower power consumption, faster access times, and increased reliability.

Although placing flash memory devices in hard disk drives does provide several advantages, these advantages come with a price and are less advantageous than they might be. Specifically, there is a great deal of price competition in the sale of computer system components in general and hard disk drives in particular. Including flash memory devices or other non-volatile memory devices in hard disk drives may increase the price of such hard disk drives to unacceptable levels. This price competition is also likely to keep the amount of flash memory on the hard drive low, and therefore provide limited benefit. Also, although the use of flash memory devices in hard disk drives can significantly reduce the latency of accessing stored data and instructions, the latency and data bandwidth are still limited by the need to couple the data and instructions through one or more bus bridges to the hierarchy level of the hard disk drive.

There is therefore a need for a computer system and method that uses non-volatile memory devices to perform functions typically performed by hard disk drives, but does so in a manner that avoids some of the disadvantages and limitations of conventional hard disk drives incorporating non-volatile memory devices.

SUMMARY OF THE INVENTION

A processor-based system includes a non-volatile memory module having a non-volatile memory buffer coupled to at least one non-volatile memory device, such as a flash memory device. The non-volatile memory module is coupled to a processor through a dynamic random access memory ("DRAM") memory buffer controller, which is also coupled to at least one DRAM module, each of which includes a memory buffer coupled to a plurality of DRAM devices. Therefore, the non-volatile memory module is located in the processor-based system at the same hierarchical level as the DRAM modules. The non-volatile memory module may be the first in a series of memory modules connected to the DRAM memory buffer controller, and the buffer in the non-volatile memory module may independently transfer data stored in the non-volatile memory devices to the DRAM devices in the other modules. The non-volatile memory buffer may include a DRAM-to-non-volatile memory converter operable to convert the DRAM memory requests to non-volatile memory requests, which are then applied to the non-volatile memory devices. The non-volatile memory buffer may also include a state machine operated by a microcontroller to generate timed signals at a sufficient rate to allow the non-volatile memory devices to operate at their maximum operating speed.

DETAILED DESCRIPTION

Figure 1:
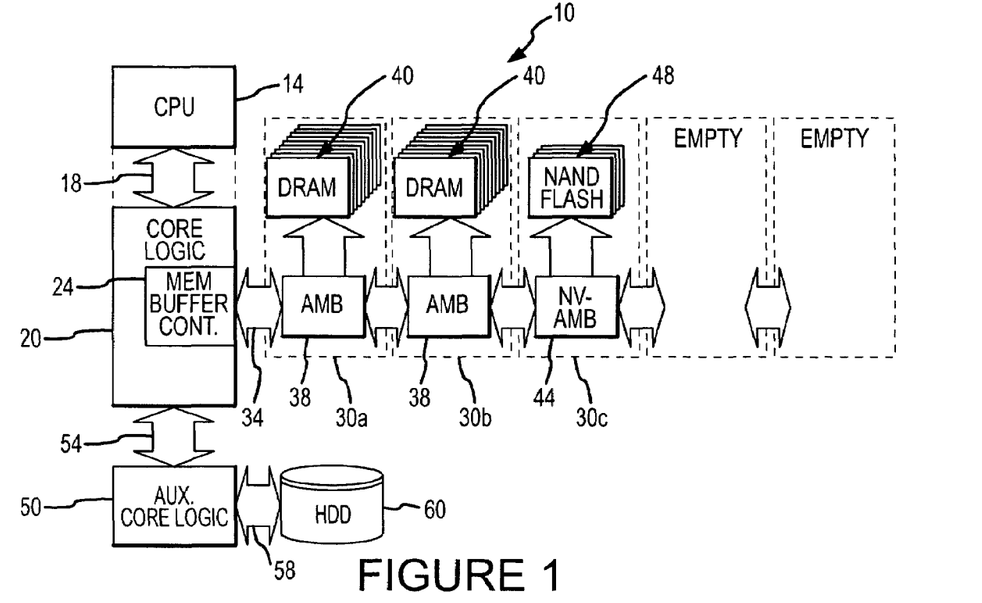
FIG. 1 is a block diagram of a computer system according to one example of the invention.

A computer system 10 according to one example of the invention is shown in FIG. 1. The computer system 10 includes a central processing unit ("CPU") 14 coupled through a processor bus 18 to core logic 20, which performs the function of a conventional system controller. The core logic 20 also includes a memory buffer controller 24, which interfaces with a plurality of system memory modules 30*a-c* through a memory bus 34.

The first two memory modules 30*a,b* each include a respective advanced memory buffer ("AMB") 38 that is coupled to a plurality of dynamic random access memory ("DRAM") devices 40. The AMB 38 is a conventional device that receives high-level memory requests from the controller 24, stores the memory requests until they can be executed, and then generates and applies corresponding address, control and write data signals to the DRAM devices 40. In the event the memory request is a read request, the AMB 38 can also receive and store the data read from the DRAM devices 40 until the memory buffer controller 24 can receive the read data. The AMB 38 then transmits the read data to the memory buffer controller 24. The AMB 38 also serves as a path for coupling commands, addresses and write data from the memory buffer controller 24 to a "downstream" memory module 30, and for coupling read data from a downstream memory module to the memory buffer controller 24. For example, when a command and address for a memory request are received by the AMB 38 in the module 30a, the AMB 38 first determines if the request if for one of the DRAMs 40 in the module 40a. If not, the AMB 38 passes the command and address to the AMB 38 in the memory module 30b.

According to one example of the invention, the third memory module 30c includes a non-volatile advanced memory buffer 44 coupled to non-volatile memory, such as a plurality of NAND flash memory devices 48. The buffer 44 may be similar to a conventional flash memory controller, and it is able to generate flash memory control and address signals from the high-level memory requests from the memory buffer controller 24. However, the high-level memory requests received by the buffer 44 are not of the type typically received by a conventional flash memory controller. Instead, the non-volatile advanced memory buffer 44 receives serialized DRAM protocol signals and converts them to flash memory protocol signals. The flash memory devices 48 perform all or some of the functions performed by conventional non-volatile memory devices used in hard disk drives. However, since the flash memory devices 48 are at the same hierarchical level as the system memory DRAM devices 40, the performance and cost disadvantages of the conventional approach are avoided. Although the computer system 10 of FIG. 1 uses NAND flash memory devices 48, it will be understood that other types of non-volatile memory devices may be used.

With further reference to FIG. 1, the core logic 20 also performs the bus bridging function of a conventional system controller to couple auxiliary core logic 50 to the CPU 14 through a first peripheral bus 54 and the processor bus 18. The core logic 50 couples the CPU 14 to a second peripheral bus 58, which is connected to a hard disk drive 60 of conventional design. The disk drive 60 operates in a conventional manner to provide non-volatile storage of data. In conventional computer systems using solid state non-volatile memory, the non-volatile memory is located with the hard disk drive 60 and is thus significantly lower in the hierarchy than the flash memory devices 48.

In the computer system 10 illustrated in FIG. 1, the flash memory devices 48 are located in the last memory module 30c in the chain of memory modules 30a-c. This architecture provides the advantage that the presence of the non-volatile memory module 30c does not adversely affect the latency of access to the DRAM 40 in the other memory modules 30a,b. However, it has the disadvantage of the non-volatile advanced memory buffer 44 being unable to pass commands to the AMBs 38 unless the AMBs were modified to receive upstream memory commands and addresses, i.e., memory commands propagating upstream toward the controller 24. However, modifying the AMBs 38 to receive upstream memory commands and addresses would have the advantage of allowing the non-volatile advanced memory buffer 44 to directly transfer blocks of data to and/or from upstream modules 30a,b. Also, allowing the AMB 38b to receive upstream memory commands and addresses would allow the non-volatile advanced memory buffer 44 to transfer data to and/or from the memory modules 30b at the same time the controller 24 is sending commands and addresses to or receiving read data from the memory module 30a.

Figure 2:
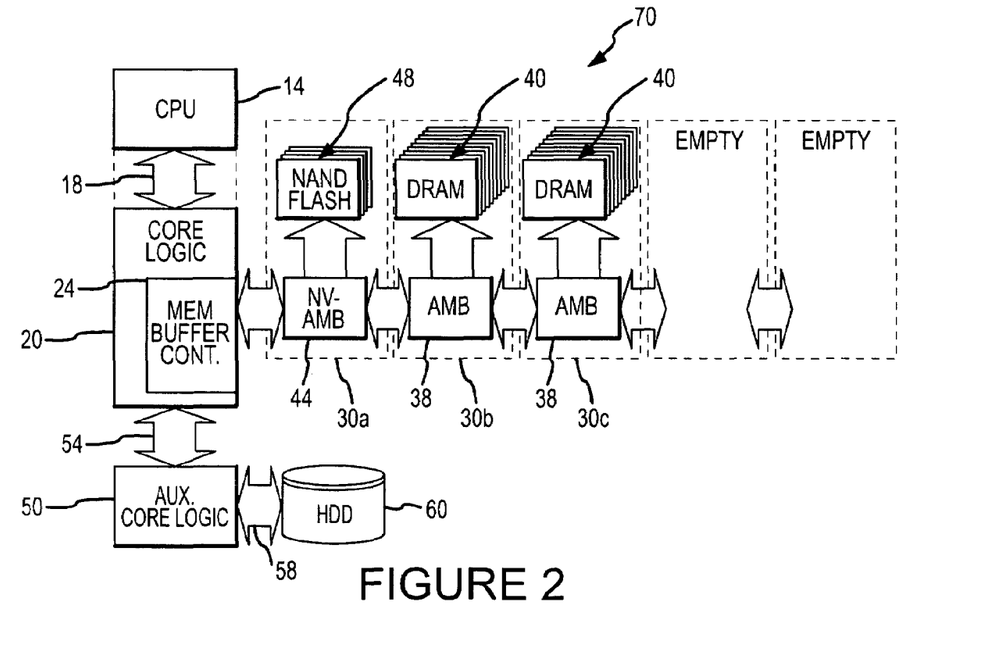
FIG. 2 is a block diagram of a computer system according to another example of the invention.

A computer system 70 according to another example of the invention is shown in FIG. 2. The computer system 70 uses the components that are used in the computer system 10, and they operate in essentially the same manner. Therefore, in the interest of brevity, an explanation of the function and operation of these components will not be repeated. The computer system 70 differs from the computer system 10 of FIG. 1 in that the first memory module 30a includes the non-volatile advanced memory buffer 44 coupled to a plurality of flash memory devices 48. Each of the remaining memory modules 30b,c include one of the AMBs 38 coupled to a plurality of DRAM devices 40. The advantage of this architecture is that the non-volatile advanced memory buffer 44 can issue commands to the AMBs 38 operating in their normal manner to transfer data from the flash memory devices 48 to the DRAMs 40. Operating in this manner can save a substantial amount of time because transferring data stored in the hard disk drive 60 to the DRAMs 40 requires the CPU 14 to read data from the hard disk drive 60 and then write the read data into the DRAMs 40 after the data have been coupled through the core logic 20, 50. Furthermore, by directly controlling the data transfer operation, the non-volatile advanced memory buffer 44 frees the CPU 14 to perform other functions.

Figure 3:
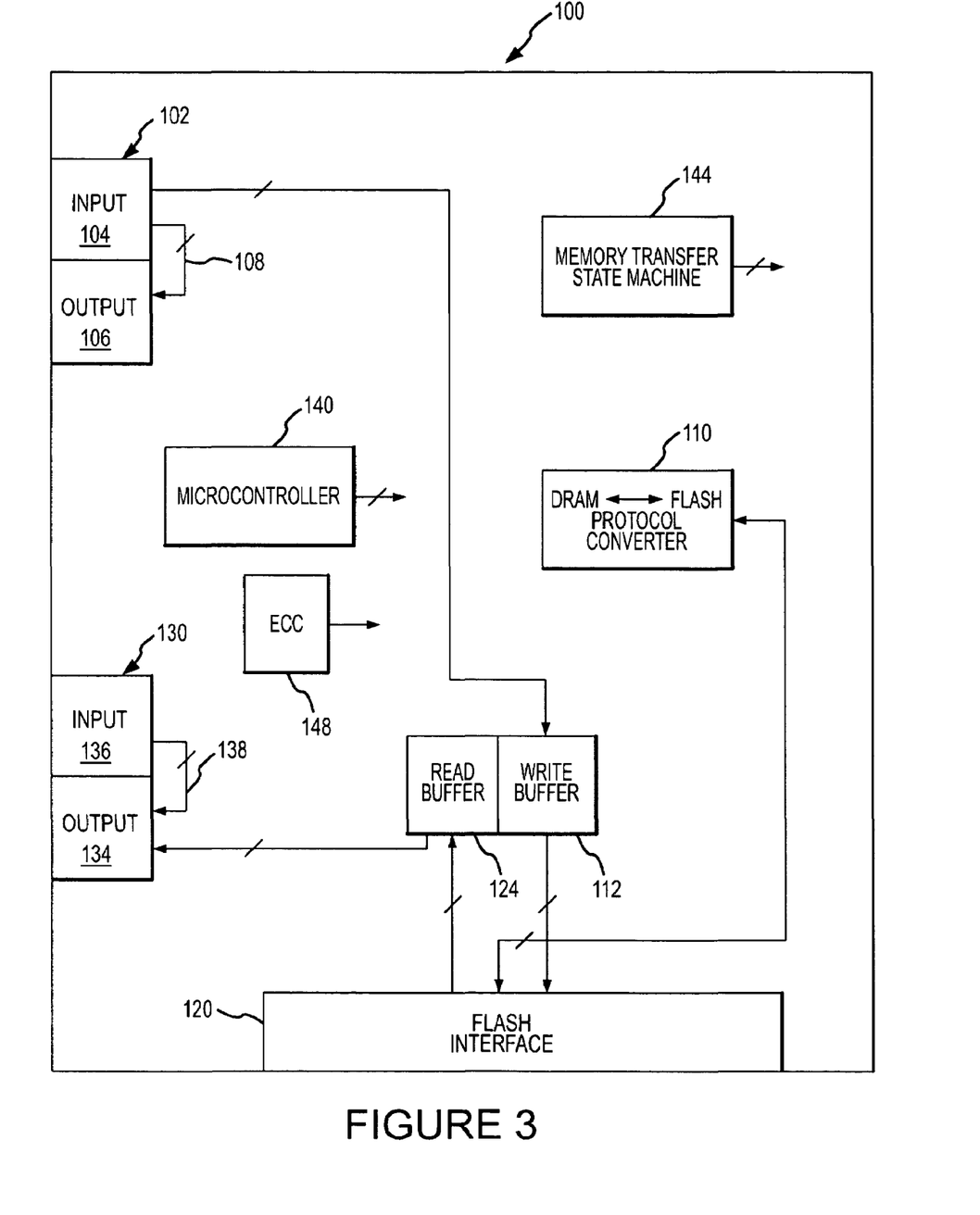
FIG. 3 is an example of a non-volatile advanced memory buffer according to one example of the invention that can be used as the computer system of FIG. 1 or 2 or in some other processor-based system.

An example of a non-volatile advanced memory buffer 100 that can be used as the non-volatile advanced memory buffer 44 in the computer systems 10, 70 is shown in FIG. 3. The buffer 100 includes a downstream link interface 102 that receives memory requests from a memory buffer controller (not shown), such as the memory buffer controller 24 in the core logic 20. The downstream link interface 102 includes two sections, an input section 104 that receives the memory requests from the memory buffer controller, and an output section 106 that passes received memory requests to downstream memory modules. For example, the buffer 100 used in the memory module 30a (FIG. 2) would receive memory requests for the memory module 30b from the memory buffer controller 24 at its input section 104 and pass those requests through a bypass path 108 on to the memory module 30b through the output section 106.

If a memory request received by the input section 104 of the downstream link interface 102 is for the flash memory devices 48, the input section 104 passes the command and address in the memory requests to a DRAM-to-flash protocol converter 110. If the memory request is a write memory request, the write data in the memory request is stored in a write buffer 112. The converter 110 generates signals according to a flash memory protocol for accessing the flash memory devices 48 responsive to received signals that are in accordance with a DRAM protocol. For example, the converter 110 may perform address translations so that an access to a single row is translated to a range of addresses for a block containing the address row since accesses to flash memory devices are normally on a block-by-block basis. In this way, the non-volatile advanced memory buffer 100 can be substituted for an AMB 38 that normally accesses DRAM memory devices 44 as shown in FIGS. 1 and 2.

After the DRAM-to-flash protocol converter 110 has generated command and address signals for accessing flash memory devices and the write buffer 112 has stored any write data signals, these signals are passed to a flash memory device interface 120. The flash memory device interface 120 would be coupled to flash memory devices, such as the NAND flash memory devices 48 used in the systems 10, 70 of FIGS. 1 and 2, respectively. The interface 120 would therefore pass the command and address signals, and possibly write data signals, to the flash memory devices. If the memory request is a read memory request, the flash memory device interface 120 receives read data signals, and then transfers the read data signals to a read buffer 124. The read buffer 124 subsequently applies the read data signals to an upstream link interface 130, and, more particularly, to an output section 134 of the interface 130. The output section 134 couples the read data signals upstream to a memory buffer controller, such as the memory buffer controller 24 shown in FIGS. 1 and 2.

The upstream link interface 130 also includes an input section 136 that receives read data signals from downstream memory modules 30 and passes the read data signals through a bypass path 138 to the output section 134 for coupling to the memory buffer controller.

The operation of the non-volatile advanced memory buffer 100 is controlled by a microcontroller 140 and a memory transfer state machine 144. The microcontroller 140 initiates transfers of memory requests to the flash memory devices at the proper time by applying control signals to the state machine 144. The state machine then generates sets of timed signals that implement the memory access corresponding to the memory access received by the downstream link interface 104. The high operating speed of the state machine 144 allows these timed signals to be generated at a speed that accesses the flash memory devices at their full operating speed. In contrast, using the microcontroller 140 to generate these timed signals would normally not allow the memory accesses to be performed at the full operating speed of the flash memory devices.

The microcontroller 140 can also perform other functions, including handling error correction errors, periodically retrying memory operations that were not completed successfully, etc. The actual processing of error correcting codes to correct data is performed by an ECC circuit 148, which may be a conventional error correcting code circuit such as a Reed-Solomon type of ECC circuit. The microcontroller 140 can also perform other functions, such as performing "wear-leveling" functions. As is well-known in the art, the number of times that flash memory device can be erased is somewhat limited. "Wear-leveling" is a process by which writes preceded by an erase directed to addresses that have been erased a relatively large number of times are mapped to addresses that have been erased a fewer number of times. The wear-leveling function performed by the microcontroller 140 can therefore prolong the useful life of flash memory devices connected to the buffer 100.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

I claim:

1. A processor-based system, comprising:
    core logic coupled to a processor bus, the core logic including a dynamic random access memory ("DRAM") memory buffer controller;
    a dynamic random access memory ("DRAM") module including a memory buffer coupled to a plurality of dynamic random access memory devices, the memory buffer being coupled to the memory buffer controller though a memory bus;
    a non-volatile memory module having a non-volatile memory buffer coupled to the memory bus and at least one non-volatile memory device coupled to the non-volatile memory buffer, the non-volatile memory buffer comprising:
        a downstream link interface coupled to receive DRAM memory requests from the DRAM memory buffer controller through a downstream portion of the memory bus;
        an upstream link interface coupled to transmit read data to the DRAM memory buffer controller though an upstream portion of the memory bus;
        a non-volatile memory device interface coupled to the at least one non-volatile memory device;
        a DRAM-to-non-volatile memory converter operable to convert the DRAM memory requests to non-volatile memory requests and to apply the non-volatile memory requests to the non-volatile memory device interface; and
        a memory transfer state machine coupled to at least one of the DRAM-to-non-volatile memory converter and the non-volatile memory device interface, the memory transfer state machine being operable to control the timing at which signals corresponding to the non-volatile memory requests are applied to the at least one non-volatile memory device from the non-volatile memory device interface; and
    a processor coupled to a processor bus, the processor bus coupling the DRAM module and the non-volatile memory module to the core logic in sequential order so that one of the modules is connected directly to the core logic and the others of the modules are connected to the core logic through another of the other modules.

2. The processor-based system of claim 1 wherein the at least one non-volatile memory device comprises at least one flash memory device.

3. The processor-based system of claim 1, further comprising a peripheral bus, and wherein the core logic comprises a bus bridge coupling the processor bus to the peripheral bus.

4. The processor-based system of claim 1 wherein the non-volatile memory module comprises the first in the series of memory modules connected to the core logic.

5. The processor-based system of claim 1 wherein the non-volatile memory module comprises the last in the series of memory modules connected to the core logic.

6. The processor-based system of claim 1 wherein the memory transfer state machine is coupled to the DRAM-to-non-volatile memory converter and is operable to control the timing at which signals corresponding to the non-volatile memory requests are applied to the non-volatile memory device interface from the DRAM-to-non-volatile memory converter.

7. The processor-based system of claim 1 wherein the non-volatile memory buffer further comprises a micro-controller coupled to the memory transfer state machine, the micro-controller being operable to initiate transfers of non-volatile memory requests to the at least one non-volatile memory device.

8. The processor-based system of claim 1 wherein the DRAM-to-non-volatile memory converter is operable to convert the DRAM memory requests to flash memory requests.

9. The processor-based system of claim 6 wherein the downstream link interface comprises:
    an input section coupled to receive DRAM memory requests from the DRAM memory buffer controller through a first section of the downstream portion of the memory bus; and
    an output section coupled to transmit DRAM memory requests received from the DRAM memory buffer controller to another memory module through a second section of the downstream portion of the memory bus.

10. The processor-based system of claim 9 wherein input section is coupled to the output section so that DRAM memory requests from the DRAM memory buffer controller received through the first section of the downstream portion of the memory bus may be coupled through the second section of the downstream portion of the memory bus to the another memory module.

11. The processor-based system of claim 6 wherein the upstream link interface comprises:
an input section coupled to receive read data from another memory module through a second section of the upstream portion of the memory bus; and
an output section coupled to transmit read data to the DRAM memory buffer controller though a first section of the upstream portion of the memory bus.

12. The processor-based system of claim 11 wherein the input section is coupled to the output section so that the read data from the another memory module received through the second section of the upstream portion of the memory bus may be transmitted through the first section of the upstream portion of the memory bus to the DRAM memory buffer controller.

13. The processor-based system of claim 1, further comprising a write buffer coupled to the downstream link interface and the non-volatile memory device interface, the write buffer being operable to store write data in write memory requests and to apply the write data to the non-volatile memory device interface.

14. The processor-based system of claim 1, further comprising a read buffer coupled to the non-volatile memory device interface and the upstream link interface, the read buffer being operable to store read data received from the non-volatile memory device interface responsive to read memory requests and to apply the read data to the upstream link interface.

15. A non-volatile memory module, comprising:
at least one non-volatile memory device; and
a non-volatile memory buffer coupled to the at least one non-volatile memory device, the non-volatile memory buffer comprising:
a downstream link interface coupled to receive DRAM memory requests;
an upstream link interface coupled to transmit read data;
a non-volatile memory device interface coupled to the at least one non-volatile memory device;
a DRAM-to-non-volatile memory converter operable to convert the DRAM memory requests to non-volatile memory requests and to apply the non-volatile memory requests to the non-volatile memory device interface; and
a memory transfer state machine coupled to at least one of the DRAM-to-non-volatile memory converter and the non-volatile memory device interface, the memory transfer state machine being operable to control the timing at which signals corresponding to the non-volatile memory requests are applied to the at least one non-volatile memory device from the non-volatile memory device interface.

16. The non-volatile memory module of claim 15 wherein the memory transfer state machine is coupled to the DRAM-to-non-volatile memory converter and is operable to control the timing at which signals corresponding to the non-volatile memory requests are applied to the non-volatile memory device interface from the DRAM-to-non-volatile memory converter.

17. The non-volatile memory module of claim 15 wherein the non-volatile memory buffer further comprises a micro-controller coupled to the memory transfer state machine, the micro-controller being operable to initiate transfers of non-volatile memory requests to the at least one non-volatile memory device.

18. The non-volatile memory module of claim 15 wherein the DRAM-to-non-volatile memory converter is operable to convert the DRAM memory requests to flash memory requests.

19. The non-volatile memory module of claim 15 wherein the downstream link interface comprises:
an input section coupled to receive DRAM memory requests coupled to the non-volatile memory module; and
an output section coupled to transmit DRAM memory requests received from the DRAM memory buffer controller.

20. The non-volatile memory module of claim 15 wherein the upstream link interface comprises:
an input section coupled to receive read data coupled to the non-volatile memory module; and
an output section coupled to transmit read data from the non-volatile memory module.

21. The non-volatile memory module of claim 15, further comprising a write buffer coupled to the downstream link interface and the non-volatile memory device interface, the write buffer being operable to store write data in write memory requests and to apply the write data to the non-volatile memory device interface.

22. The non-volatile memory module of claim 15, further comprising a read buffer coupled to the non-volatile memory device interface and the upstream link interface, the read buffer being operable to store read data received from the non-volatile memory device interface responsive to read memory requests and to apply the read data to the upstream link interface.

23. The non-volatile memory module of claim 15 wherein the at least one non-volatile memory device comprises at least one flash memory device.

24. The non-volatile memory module of claim 15 wherein the non-volatile memory buffer further comprises circuitry operable to correct data read from the at least one non-volatile memory device.

25. A non-volatile memory buffer, comprising:
a downstream link interface coupled to receive DRAM memory requests;
an upstream link interface coupled to transmit read data;
a non-volatile memory device interface adapted to be coupled to a non-volatile memory device;
a DRAM-to-non-volatile memory converter operable to convert the DRAM memory requests to non-volatile memory requests and to apply the non-volatile memory requests to the non-volatile memory device interface; and
a memory transfer state machine coupled to at least one of the DRAM-to-non-volatile memory converter and the non-volatile memory device interface, the memory transfer state machine being operable to control the timing at which signals corresponding to the non-volatile memory requests are output from the non-volatile memory device interface.

26. The non-volatile memory buffer of claim 25 wherein the memory transfer state machine is coupled to the DRAM-to-non-volatile memory converter and is operable to control the timing at which signals corresponding to the non-volatile memory requests are applied to the non-volatile memory device interface from the DRAM-to-non-volatile memory converter.

27. The non-volatile memory buffer of claim 25 wherein the non-volatile memory buffer further comprises a micro-controller coupled to the memory transfer state machine, the micro-controller being operable to initiate transfers of non-volatile memory requests from the non-volatile memory interface.

28. The non-volatile memory buffer of claim 25 wherein the DRAM-to-non-volatile memory converter is operable to convert the DRAM memory requests to flash memory requests.

29. The non-volatile memory buffer of claim 25 wherein the downstream link interface comprises:
   an input section coupled to receive DRAM memory requests coupled to the non-volatile memory module; and
   an output section coupled to transmit DRAM memory requests received from the DRAM memory buffer controller.

30. The non-volatile memory buffer of claim 25 wherein the upstream link interface comprises:
   an input section coupled to receive read data coupled to the non-volatile memory module; and
   an output section coupled to transmit read data from the non-volatile memory module.

31. The non-volatile memory buffer of claim 25, further comprising a write buffer coupled to the downstream link interface and the non-volatile memory device interface, the write buffer being operable to store write data in write memory requests and to apply the write data to the non-volatile memory device interface.

32. The non-volatile memory buffer of claim 25, further comprising a read buffer coupled to the non-volatile memory device interface and the upstream link interface, the read buffer being operable to store read data received from the non-volatile memory device interface responsive to read memory requests and to apply the read data to the upstream link interface.

33. The non-volatile memory buffer of claim 25, further comprising circuitry operable to correct data read from the at least one non-volatile memory device.

34. A processor-based system, comprising:
   a processor coupled to a processor bus;
   core logic coupled to the processor through the processor bus, the core logic including a dynamic random access memory ("DRAM") memory buffer controller;
   a dynamic random access memory ("DRAM") module including a memory buffer coupled to a plurality of dynamic random access memory devices, the memory buffer being coupled to the memory buffer controller though a memory bus; and
   a non-volatile memory module having a non-volatile memory buffer coupled to the memory bus and at least one non-volatile memory device coupled to the non-volatile memory buffer; the non-volatile memory comprising:
      a downstream link interface coupled to receive DRAM memory requests from the DRAM memory buffer controller through a downstream portion of the memory bus;
      an upstream link interface coupled to transmit read data to the DRAM memory buffer controller though an upstream portion of the memory bus;
      a non-volatile memory device interface coupled to the at least one non-volatile memory device;
      a DRAM-to-non-volatile memory converter operable to convert the DRAM memory requests to non-volatile memory requests and to apply the non-volatile memory requests to the non-volatile memory device interface; and
      a memory transfer state machine coupled to at least one of the DRAM-to-non-volatile memory converter and the non-volatile memory device interface, the memory transfer state machine being operable to control the timing at which signals corresponding to the non-volatile memory requests are applied to the at least one non-volatile memory device from the non-volatile memory device interface.

35. The processor-based system of claim 34 wherein the memory transfer state machine is coupled to the DRAM-to-non-volatile memory converter and is operable to control the timing at which signals corresponding to the non-volatile memory requests are applied to the non-volatile memory device interface from the DRAM-to-non-volatile memory converter.

36. The processor-based system of claim 34 wherein the non-volatile memory buffer further comprises a micro-controller coupled to the memory transfer state machine, the micro-controller being operable to initiate transfers of non-volatile memory requests to the at least one non-volatile memory device.

37. The processor-based system of claim 34 wherein the DRAM-to-non-volatile memory converter is operable to convert the DRAM memory requests to flash memory requests.

38. The processor-based system of claim 35 wherein the downstream link interface comprises:
   an input section coupled to receive DRAM memory requests from the DRAM memory buffer controller through a first section of the downstream portion of the memory bus; and
   an output section coupled to transmit DRAM memory requests received from the DRAM memory buffer controller to another memory module through a second section of the downstream portion of the memory bus.

39. The processor-based system of claim 38 wherein the input section is coupled to the output section so that DRAM memory requests from the DRAM memory buffer controller received through the first section of the downstream portion of the memory bus may be coupled through the second section of the downstream portion of the memory bus to the another memory module.

40. The processor-based system of claim 35 wherein the upstream link interface comprises:
   an input section coupled to receive read data from another memory module through a second section of the upstream portion of the memory bus; and
   an output section coupled to transmit read data to the DRAM memory buffer controller though a first section of the upstream portion of the memory bus.

41. The processor-based system of claim 34, further comprising a write buffer coupled to the downstream link interface and the non-volatile memory device interface, the write buffer being operable to store write data in write memory requests and to apply the write data to the non-volatile memory device interface.

42. The processor-based system of claim 34, further comprising a read buffer coupled to the non-volatile memory device interface and the upstream link interface, the read buffer being operable to store read data received from the non-volatile memory device interface responsive to read memory requests and to apply the read data to the upstream link interface.

43. A processor-based system, comprising:
   core logic coupled to the processor through the processor bus, the core logic including a dynamic random access memory ("DRAM") memory buffer controller;

a dynamic random access memory ("DRAM") module including a memory buffer coupled to a plurality of dynamic random access memory devices, the memory buffer being coupled to the memory buffer controller though a memory bus;

a non-volatile memory module having a non-volatile memory buffer coupled to the memory bus and at least one non-volatile memory device coupled to the non-volatile memory buffer, the non-volatile memory buffer further comprising circuitry operable to correct data read from the at least one non-volatile memory device; and a processor coupled to a processor bus, the processor bus coupling the DRAM module and the non-volatile memory module to the core logic in sequential order so that one of the modules is connected directly to the core logic and the others of the modules are connected to the core logic through another of the other modules.

44. The processor-based system of claim 43 wherein the at least one non-volatile memory device comprises at least one flash memory device.

45. The processor-based system of claim 43, further comprising a peripheral bus, and wherein the core logic comprises a bus bridge coupling the processor bus to the peripheral bus.

46. The processor-based system of claim 43 wherein the non-volatile memory module comprises the first in the series of memory modules connected to the core logic.

47. The processor-based system of claim 43 wherein the non-volatile memory module comprises the last in the series of memory modules connected to the core logic.

48. The processor-based system of claim 43 wherein the non-volatile memory buffer comprises:
    a downstream link interface coupled to receive DRAM memory requests from the DRAM memory buffer controller through a downstream portion of the memory bus;
    an upstream link interface coupled to transmit read data to the DRAM memory buffer controller though an upstream portion of the memory bus;
    a non-volatile memory device interface coupled to the at least one non-volatile memory device;
    a DRAM-to-non-volatile memory converter operable to convert the DRAM memory requests to non-volatile memory requests and to apply the non-volatile memory requests to the non-volatile memory device interface; and
    a memory transfer state machine coupled to at least one of the DRAM-to-non-volatile memory converter and the non-volatile memory device interface, the memory transfer state machine being operable to control the timing at which signals corresponding to the non-volatile memory requests are applied to the at least one non-volatile memory device interface.

49. The processor-based system of claim 48 wherein the memory transfer state machine is coupled to the DRAM-to-non-volatile memory converter and is operable to control the timing at which signals corresponding to the non-volatile memory requests are applied to the non-volatile memory device interface from the DRAM-to-non-volatile memory converter.

50. The processor-based system of claim 48 wherein the non-volatile memory buffer further comprises a micro-controller coupled to the memory transfer state machine, the micro-controller being operable to initiate transfers of non-volatile memory requests to the at least one non-volatile memory device.

51. The processor-based system of claim 48 wherein the DRAM-to-non-volatile memory converter is operable to convert the DRAM memory requests to flash memory requests.

52. The processor-based system of claim 49 wherein the downstream link interface comprises:
    an input section coupled to receive DRAM memory requests from the DRAM memory buffer controller through a first section of the downstream portion of the memory bus; and
    an output section coupled to transmit DRAM memory requests received from the DRAM memory buffer controller to another memory module through a second section of the downstream portion of the memory bus.

53. The processor-based system of claim 52 wherein the input section is coupled to the output section so that DRAM memory requests from the DRAM memory buffer controller received through the first section of the downstream portion of the memory bus may be coupled through the second section of the downstream portion of the memory bus to the another memory module.

54. The processor-based system of claim 49 wherein the upstream link interface comprises:
    an input section coupled to receive read data from another memory module through a second section of the upstream portion of the memory bus; and
    an output section coupled to transmit read data to the DRAM memory buffer controller though a first section of the upstream portion of the memory bus.

55. The processor-based system of claim 54 wherein the input section is coupled to the output section so that the read data from the another memory module received through the second section of the upstream portion of the memory bus may be transmitted through the first section of the upstream portion of the memory bus to the DRAM memory buffer controller.

56. The processor-based system of claim 48, further comprising a write buffer coupled to the downstream link interface and the non-volatile memory device interface, the write buffer being operable to store write data in write memory requests and to apply the write data to the non-volatile memory device interface.

57. The processor-based system of claim 48, further comprising a read buffer coupled to the non-volatile memory device interface and the upstream link interface, the read buffer being operable to store read data received from the non-volatile memory device interface responsive to read memory requests and to apply the read data to the upstream link interface.

* * * * *

UNITED STATES PATENT AND TRADEMARK OFFICE
CERTIFICATE OF CORRECTION

PATENT NO. : 7,564,722 B2
APPLICATION NO. : 11/656578
DATED : July 21, 2009
INVENTOR(S) : Dean A. Klein It is certified that error appears in the above-identified patent and that said Letters Patent is hereby corrected as shown below:

| Column, Line | Reads | Should Read |
|---|---|---|
| Column 5, Line 58 | "though a memory bus" | --through a memory bus-- |
| Column 6, Line 2 | "though an" | --through an-- |
| Column 6, Line 19 | "a processor bus, the processor bus" | --the processor bus, the memory bus-- |
| Column 7, Line 10 | "though a first section" | --through a first section-- |
| Column 9, Line 41 | "coupled to the processor through the processor" | --coupled to a processor through a processor-- |
| Column 9, Line 48 | "though a memory bus" | --through a memory bus-- |
| Column 9, Line 52 | "memory buffer; the non-volatile memory" | --memory buffer, the non-volatile memory buffer-- |
| Column 9, Line 59 | "controller though an" | --controller through an-- |
| Column 10, Line 49 | "though a first section" | --through a first section-- |
| Column 10, Line 65 | "coupled to the processor through the processor" | --coupled to a processor through a processor-- |
| Column 11, Line 5 | "though a memory bus" | --through a memory bus-- |
| Column 11, Line 13 | "coupled to a processor bus, the processor bus" | --coupled to the processor bus, the memory bus-- |

UNITED STATES PATENT AND TRADEMARK OFFICE
CERTIFICATE OF CORRECTION

PATENT NO.         : 7,564,722 B2
APPLICATION NO.    : 11/656578
DATED              : July 21, 2009
INVENTOR(S)        : Dean A. Klein It is certified that error appears in the above-identified patent and that said Letters Patent is hereby corrected as shown below:

| Column, Line | Reads | Should Read |
|---|---|---|
| Column 11, Line 38 | "controller though an" | --controller through an-- |
| Column 12, Line 36 | "controller though a" | --controller through a-- |

Signed and Sealed this

Seventeenth Day of November, 2009

David J. Kappos
*Director of the United States Patent and Trademark Office*